(12) United States Patent
Horesh et al.

(10) Patent No.: US 11,657,194 B2
(45) Date of Patent: May 23, 2023

(54) EXPERIMENTAL DESIGN FOR SYMBOLIC MODEL DISCOVERY

(71) Applicant: International Business Machines Corporation, Armonk, NY (US)

(72) Inventors: Lior Horesh, North Salem, NY (US); Kenneth L. Clarkson, Madison, NJ (US); Cristina Cornelio, White Plains, NY (US); Sara Magliacane, Peekskill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 16/855,085

(22) Filed: Apr. 22, 2020

(65) Prior Publication Data

US 2021/0334432 A1    Oct. 28, 2021

(51) Int. Cl.
  *G06F 30/20*    (2020.01)
  *G06F 111/10*    (2020.01)

(52) U.S. Cl.
  CPC .......... *G06F 30/20* (2020.01); *G06F 2101/14* (2013.01); *G06F 2111/10* (2020.01)

(58) Field of Classification Search
  CPC ...... G06F 30/00; G06F 30/20; G06F 2101/14; G06F 2111/10
  USPC .......................................................... 703/2
  See application file for complete search history.

(56) References Cited

U.S. PATENT DOCUMENTS

| 7,720,236 | B2 | 5/2010 | Oxford |
| 7,926,025 | B2 | 4/2011 | Campbell et al. |
| 8,065,125 | B2 | 11/2011 | Hall |
| 8,332,188 | B2 | 12/2012 | McConaghy |
| 11,080,363 | B2 * | 8/2021 | Horesh ................. G06N 5/006 |

(Continued)

OTHER PUBLICATIONS

Cornelio, Cristina, Sanjeeb Dash, Vernon Austel, Tyler Josephson, Joao Goncalves, Kenneth Clarkson, Nimrod Megiddo, Bachir El Khadir, and Lior Horesh. "AI Descartes: Combining Data and Theory for Derivable Scientific Discovery." arXiv preprint arXiv:2109.01634 (2021) (Year: 2021).*

(Continued)

*Primary Examiner* — Cedric Johnson
(74) *Attorney, Agent, or Firm* — Lily Neff

(57) ABSTRACT

A method for optimal design of experiments for joint model selection and parametrization determination of a symbolic mathematical model includes: determining a prediction value for a given inquiry data point, functional form and parameterization for conducting an experiment relating to a system under investigation; assuming a set of input-output data pairs as a starting point in a model discovery process relating to the system under investigation; performing discovery of symbolic models minimizing complexity for a bounded misfit, or minimizing a misfit measure, subject to bounded complexity; determining a new data point through optimal experimental design that informs best as for the underlying symbolic models; and updating a posterior distribution, given results of the experiment relating to the system under investigation for the determined new data point to enable informed assessment among a plurality of functional forms and parameterizations. An apparatus configured to perform the method is also provided.

19 Claims, 4 Drawing Sheets

(56) References Cited

U.S. PATENT DOCUMENTS

| | | | |
|---|---|---|---|
| 2003/0033127 A1* | 2/2003 | Lett | G06T 5/002 703/11 |
| 2006/0079983 A1* | 4/2006 | Willis | G05B 17/02 700/108 |
| 2012/0189994 A1 | 7/2012 | Siler | |
| 2012/0310619 A1 | 12/2012 | McConaghy | |
| 2017/0004231 A1* | 1/2017 | Avron | G06F 17/10 |
| 2018/0349798 A1 | 12/2018 | Avron et al. | |
| 2021/0264075 A1* | 8/2021 | Junginger | G06F 30/20 |

OTHER PUBLICATIONS

Schmidt, Michael, and Hod Lipson. "Distilling free-form natural laws from experimental data." science 324, No. 5923 (2009): 81-85 (with supplementary material—26 pages total) (Year: 2009).*

Austel, Vernon, Sanjeeb Dash, Oktay Gunluk, Lior Horesh, Leo Liberti, Giacomo Nannicini, and Baruch Schieber. "Globally optimal symbolic regression." arXiv preprint arXiv:1710.10720 (2017), 6 pages (Year: 2017).*

J. Lin, "Divergence measures based on the Shannon entropy," in IEEE Transactions on Information Theory, vol. 37, No. 1, pp. 145-151, Jan. 1991, doi: 10.1109/18.61115 (Year: 1991).*

Stijven, Sean, Ekaterina Vladislavleva, Arthur Kordon, Lander Willem, and Mark E. Kotanchek. "Prime-time: Symbolic regression takes its place in the real world." In Genetic Programming Theory and Practice XIII, pp. 241-260. Springer, Cham, 2016 (Year: 2016).*

Haber E et al., "Numerical Methods for the Design of Large-Scale Nonlinear Discrete Ill-Posed Inverse Problem", Dec. 18, 2009, Inverse Problems 26, IOP Publishing. (Year: 2009).*

Bocic et al., "Symbolic Model Extraction for Web Application Verification," IEEE/ACM 39th International Conference on Software Engineering (ICSE), pp. 1-11; 2017.

Bhat, H. S. et al., "On the derivation of the Bayesian Information Criterion," pp. 1-4; 2010.

Akaike, H. (1973), "Information Theory and an Extension of the Maximum Likelihood Principle," In Petrov, B. N.; Csáki, F., 2nd International Symposium on Information Theory, USSR, Sep. 2-8, 1971, Budapest Akadémiai Kiadó, pp. 267-281; republished in Kotz, S.; Johnson, N.L., eds. (1992), "Breakthroughs in Statistics, I," Springer-Verlag, pp. 610-624.

G. Shulkind et al. "Experimental Design for Nonparametric Correction of Misspecified Dynamical Models," SIAM/ASA J. Uncertainty Quant., vol. 6, No. 2, pp. 880-906; 2018.

E. Haber et al., "Numerical Methods for Experimental Design of Large-Scale Linear Ill-Posed Inverse Problems," Inverse Problems, vol. 24, No. 5, pp. 1-17; 2008.

F. Pukelsheim, "Optimal Design of Experiments," SIAM, 2006, ISBN-13: 978-0898716047, pp. 61-97, 114-134, 210-246.

Haber, et al., "Numerical Methods for the Design of Large-scale Nonlinear Discrete III-posed Inverse Problems", 2010 Inverse Problems 26 025002, IOP Publishing, Published Dec. 18, 2009, 15 pgs.

* cited by examiner

EXPERIMENTAL DESIGN FOR SYMBOLIC MODEL DISCOVERY

BACKGROUND

The present invention relates generally to methods for experimental design, and more specifically, to free-form symbolic model discovery.

An experiment is a process or study that results in collection of data. The results of experiments are not known in advance. Usually, statistical experiments are conducted in situations in which researchers can manipulate conditions of the experiment and can control factors that are related to research objectives. Experimental design is the process of planning a study to meet specified objectives. Planning an experiment properly is important in order to ensure that the right type of data and a sufficient sample size and power are available to answer the research questions of interest as clearly and efficiently as possible.

Experiments conducted to investigate or provide empirical evidence to substantiate a theory can be costly to run. In order to achieve a significant number of data points, a multitude of experiments and tests may need to be conducted. It is, therefore, desirable to optimize the experimental processes in order to minimize the cost and effort needed to achieve scientifically significant results.

Conceptualizing the behavior of a system or a phenomenon and distilling it into a consistent mathematical model is instrumental for a broad range of applications. Historically, models were manually derived in a first principles approach, which often involves the derivation of interpretable models of remarkable levels of universality using little data. Nevertheless, their derivation is time consuming and relies heavily upon domain expertise. Conversely, with the rising pervasiveness of data-driven approaches, the rapid derivation and deployment of models has become a reality. Scalability is gained through dependence upon exploitable structure (functional form). Such structures, in turn, yield non-interpretable models, require Big Data for training, and provide limited predictive power outside the training set span.

Free-form symbolic discovery relies on inference of both model functional form and its parametrization with controllable levels of complexity and fidelity measures. Most free-form model discovery/symbolic regression approaches are based upon (imperative) synthesis formulation. Alternatively, it is possible to consider a declarative formulation in which a symbolic model constitutes a valid (i.e., parsable) sentence in a formal language comprising operators, variables and coefficients. In such a formulation, a search is done in the space of sentences (i.e., mathematical expressions) for one that minimizes a measure of complexity while adhering to a fidelity error bound, or vice versa. A key challenge is to figure out which additional data or experiments need to be conducted in order to gain better understanding of the underlying model (functional structure and parametrization).

Experimental design approaches propose the next experiments to be performed in order to discover a model that is more likely to be correct among several alternatives. These models are usually given in terms of both the functional form (i.e., the structure of the expression and the assignment of variables and functions) and the parameters. Most existing approaches assume that the functional form is known a priori, and therefore the experiments are designed to find the best parameter assignment or alternatively that only model selection, amongst several pre-determined functional forms and parameterizations is pursued. In contrast, in free-form symbolic discovery, there are several possible functional forms that fit the data, as well as several possible parameter assignments, and additional experiments are needed to narrow down the true possible model.

SUMMARY

The present invention, as manifested in embodiments thereof, provides a method and apparatus for optimal design of experiments for joint model selection and parametrization determination of a symbolic mathematical model.

In accordance with an embodiment of the invention, a method for optimal design of experiments for joint model selection and parametrization determination of a symbolic mathematical model includes: determining a prediction value for a given inquiry data point, functional form and parameterization for conducting an experiment relating to a system under investigation; assuming a set of input-output data pairs as a starting point in a model discovery process relating to the system under investigation; performing discovery of symbolic models minimizing complexity for a bounded misfit, or minimizing a misfit measure, subject to bounded complexity; determining a new data point through optimal experimental design that informs best as for the underlying symbolic models; and updating a posterior distribution, given results of the experiment relating to the system under investigation for the determined new data point to enable informed assessment among a plurality of functional forms and parameterizations.

In accordance with another embodiment of the invention, an exemplary apparatus for selecting at least one new data point through optimal experimental design includes memory and at least one processor operably coupled with the memory. The processor is configured: to assume a set of input data pairs as a starting point in a model discovery process relating to a system under investigation, based at least in part on inquiry input data; and to generate prediction values for a given input-output data set and candidate functional forms along with their respective parameterizations. The prediction values are used to determine an optimal experiment and/or a sequence of experiments that provides the most information enabling experimental data-substantiated distinction between functional forms and respective parameterizations for underlying mathematical models describing the system under investigation.

Techniques of the present invention can provide substantial beneficial technical effects. By way of example only and without limitation, apparatus, methods and systems according to one or more embodiments of the invention may provide at least one or more of the following advantages:
- mathematical programming-based solution that is further enhanced by experimental design that leads to a most promising experiment selection;
- minimizes complexity for a bounded misfit, or minimizes a misfit measure, subject to bounded complexity;
- selects a new data point through optimal experimental design that informs best for an underlying symbolic model.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Non-limiting and non-exhaustive embodiments of the present invention will be described with reference to the following drawings which are presented by way of example only, wherein like reference numerals (when used) indicate corresponding elements throughout the several views unless otherwise specified, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present disclosure will be described herein. It is to be appreciated, however, that the specific methods and/or apparatus illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

Figure 1:
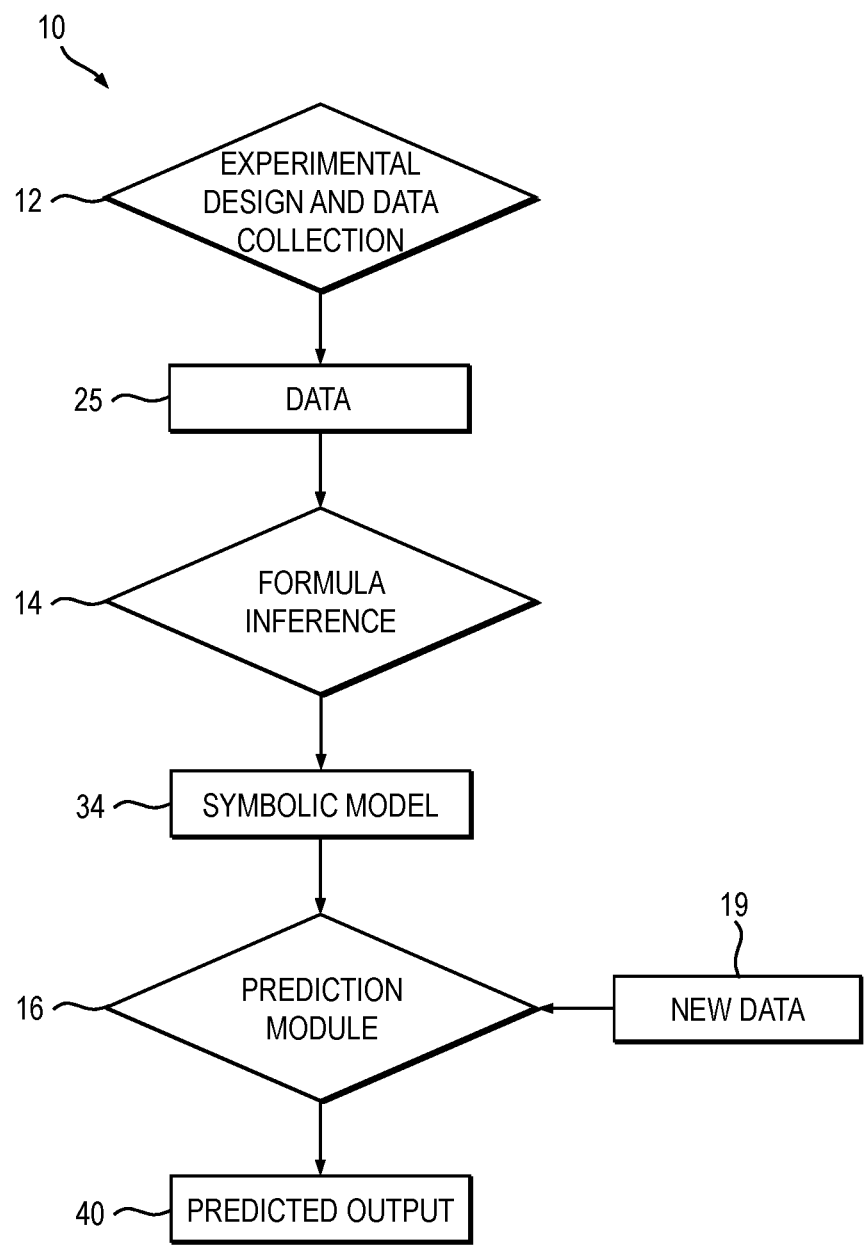
FIG. 1 is a general block diagram of an exemplary the system of the present disclosure.

FIG. 1 is a schematic diagram depicting at least a portion of an exemplary system 10 according to one or more embodiments of the present disclosure. The system 10 prescribes an experiment or sequence of experiments that maximizes the information gain and minimizes cost and effort. The experiments are chosen such that both the parametrization as well as the functional form of the discovered model are most informative for the model discovery mission. The current disclosure is directed to a system and method for experimental design of freeform, symbolic model discovery. A symbolic model, as the term is used herein, preferably includes a functional form (e.g., structure or grammar) and tunable parameters (e.g., constants appearing in an equation).

Figure 2:
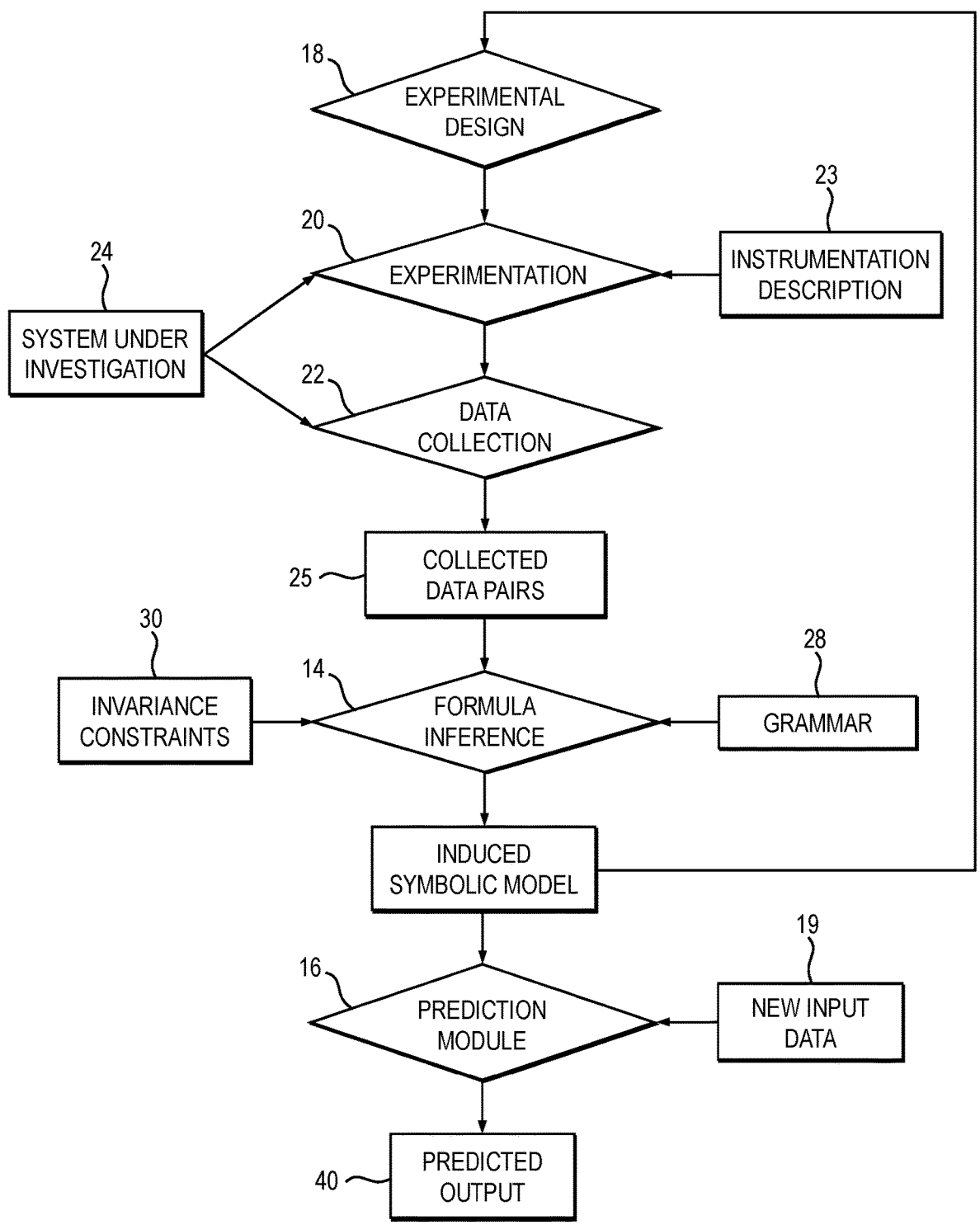
FIG. 2 is a detailed system flowchart depicting at least a portion of functional components of an exemplary system according to one or more embodiments of the present disclosure.

With reference to FIGS. 1 and 2, a schematic diagram depicting at least a portion of the system 10, with the diamond-shaped components representing hardware or software modules that will perform a transformation on the hardware or software modules represented by the rectangular components, which represent static and represent data (in different formats) or physical environments.

With reference to FIG. 1, the system 10 is composed of three basic elements or modules: an experimental design and data collection module 12; a discovery engine 14, also referred to as a formula discovery module; and a prediction module 16. These various modules may be formed of software, hardware or a combination of the two. With reference to FIG. 1 and FIG. 2, the various modules will be now described at a high level.

Experimental Design and Data Collection Module

The experimental design and data collection module 12 of FIG. 1 corresponds to the following modules: experimental design module 18, experimentation module 20 and data collection module 22 all applied to the system under investigation 24. These various modules may be formed of software, hardware or a combination of the two.

The experimental design module 18 of FIG. 2 has the role of determining the next most informative experiment; i.e. the experiment that provides the most information with respect to current estimates of the model structure and parameters, given the output of the previous iteration of the symbolic regression module.

First, the experimental design module 18 proposes the parameters for the next sequence of experiments. Then, these parameters and the instrumentation description 23 are provided to the experimentation module 20, which produces the sequence of actions to be executed by the instrumentation for each experiment in the data collection module 22. The data collection module 22 corresponds to the hardware that uses the sequence of actions to perform the experiments and collects the output data of the system under investigation under the different experimental regimes.

Formula Inference or Discovery Module

The data pairs (observations of a process or phenomenon) 25, collected by the experimental design module 20 and data collection module 22, are then provided to the formula discovery module 14.

The discovery module 14 includes optimal symbolic regression articulated as a declarative mathematical programming problem, and discovers the simplest model that honors the data, consistent with the grammar and the invariants. The discovery module 14 preferably receives input in the form of modeling primitives, such as a superset of mathematical expressions, input-output data pairs, and possibly additional set(s) of constraints or modeling preferences.

A grammar element 28 that defines and encodes as constraints a grammar of the discovered entity is operably connected to the discovery module 14. For example, if the model were a mathematical expression(s), the grammar element 28 would ensure that mathematical symbols and syntax employed are consistent.

The discovery module 14 may also be operably connected to a set of invariance constraints or invariants 30. The invariants 30 may include symmetries, conservation laws, simplicity, and other invariants imposed consistently as contradictions or penalties. The discovery module 14 may output a fundamental symbolic relation or model 34 (i.e., a formula), e.g., $E=mc^2$. Once a formula is determined, the system 10 can use it as a prediction model.

In one or more embodiments, the formula inference or discovery module 14 of the system 10 receives several pairs of input and output data $(x,y) \in (\mathcal{X}, \mathcal{Y})$. The formula discovery module 14 is configured to choose among the possible mathematical expressions that fit the data, within a prescribed error bound. An objective of the system 10 is to minimize the description complexity of the expression subject to the bounded error. Alternatively, one can pursue minimization of the prediction misfit for a bounded level of complexity.

The experimental design component receives access to the discovery functionality (e.g., either as a black or white box), as well as input regarding the feasible domain in which input data can be collected, the design component then seeks for a feasible experimental design, whose respective input and output values informs most as for the discovered model functional form and its parametrization.

For example, the mathematical expression that may govern the system, which is the subject of an experiment, may not be known. It is thus desired to find a suitable symbolic expression or model, e.g., an equation, of some functional form. Without the input data, the model is just a function or symbolic expression, e.g. a mathematical formula, expression tree or any other representation of that model. It is desired to find the parameters θ that will minimize a complexity of the symbolic model. It is contemplated that the term "complexity" can be defined in manners known in the art, such as, for example, minimum description complexity, or Kolmogorov computational complexity measure.

Let γ determine the functional form, and θ its parametrization, $\mathcal{T}$ a parsable grammar, v the prediction (evaluation of the symbolic expression at a specific datum), x the input datum and V a set of properties or invariants that qualifies the expression as viable. Furthermore, let $f_\gamma$ represent an expression tree or other valid model. The expression $\gamma = \text{argmin}_\gamma c(f_\gamma)$ represents a complexity minimizer, where $c(f_\gamma)$ represents a complexity function of $f_\gamma$. $f_\gamma$ must obey certain grammatical rules; for example, a valid syntax of mathematical expressions. In one or more embodiments, the various grammatical parameters may be encoded in the grammatical constraint, such that $f_\gamma \in \mathcal{T}$ represents an adherence to grammatical constraints.

Many potential models will not provide accurate predictions. In one or more embodiments, the system 10 is configured to search for a simplest model that is also accurate in predicting the data.

For a given pair (x,y), a model $f_{\gamma,\theta}$ will estimate y as $v=f_{\gamma,\theta}(x)$. Given an appropriate distance measure D as described in the literature, D(v,y) will represent the distance between the estimated output v and the actual output y. Given an error bound ∈, an accurate model will have the distance measure D lie between the estimated output (v) and the actual output (y) that is bounded by E; that is, $\mathcal{L}(v,y) \leq \in$.

Following current scientific practice, a good model can be defined as a model that is not complex, but still provides accurate predictions. In order to identify a model that is accurate, one approach is to estimate the probability of the observed data, assuming that the model is the true one and any discrepancies from its predictions are due to noise, where the noise is less likely to be small in magnitude. For example, input (training) data is plugged into the proposed model and the resulting output data is compared to output data that exists. If the discrepancy between the two is bounded, then the observed data is likely, given the model.

That means that for a given pair (x,y), a model $f_{\gamma,\theta}$ will estimate the actual output y as $v=f_{\gamma,\theta}(x)$. Given an appropriate distance measure D as described in the literature, D(v,y) will represent the distance between the estimated output and the actual output y. Given an error bound ∈, an accurate model will have distance between the estimated and the actual output that is bounded by ∈, or $\mathcal{L}(v,y) \leq \in$.

Different error bounds E are considered, and the researcher is aided by displaying the tradeoff between the error $\mathcal{L}(v,y)$, and the complexity $c(f_{\gamma,\theta})$ of the predictor $f_{\gamma,\theta}$ determined by γ and θ, allowing human judgment and choice. In this example, $\mathcal{L}(f_{\gamma,\theta}(\tilde{x}),\tilde{y})=\mathcal{L}(v,y) \leq \in$ represents the error.

The module requires that the model have some specified properties. For example, it may be known that the model satisfies some invariants. All those parameters can be encoded as part of a virtue constraint using the expression $f_{\gamma,\theta} \in V$ virtue/invariance.

With continued reference to FIGS. 1 and 2, grammar constraints associated with the grammar element 28 are transmitted to the formula discovery module 14. The grammar constraints ensure that only feasible formula syntax is employed. Invariance constraints 30 may also be communicated to the discovery module 14. Invariance constraints 30 are used by the discovery module 14, in one or more embodiments, to filter out equivalent or nonviable solutions. It is contemplated that many types of invariants can be encoded into the system 10. For instance, some simple invariants can be the commutativity of an operator (e.g., a+b=b+a) or the equivalence between expressions (e.g., c(a+b)=ca+cb or $e^{\log x}=x$). However, invariants can also be more complex, such as, for example, laws of conservation (e.g., conservation of mass, momentum, angular moment, energy, etc.), or various forms of invariance, such as translation, rotation, frame of reference invariances.

Prediction Module

The prediction module 16 calculates, as an output, a predicted value 40 for a given input dataset. Thus, the prediction module 16 receives inquiry input data 19 (e.g., new data that the system never received before). For example, this could be data obtained from a new experiment. The input data is processed for a given functional form and parametrization, such as an equation or function that is thought to govern the experiment. The prediction module 16 then outputs the prediction value or values 40.

For example, a model $f_{\gamma,\theta}$ of a predefined functional form representation γ and parametrization θ is given. The prediction value, v, for a given input datum x is determined. A sample equation for this relation is as follows:

$$v=f_{\gamma,\theta}(x)$$

Input x may be, for example, a set of numbers, vectors, matrix, etc. In one or more embodiments, the model may be in the form of an expression tree and obey a certain syntax/grammar.

Figure 3:
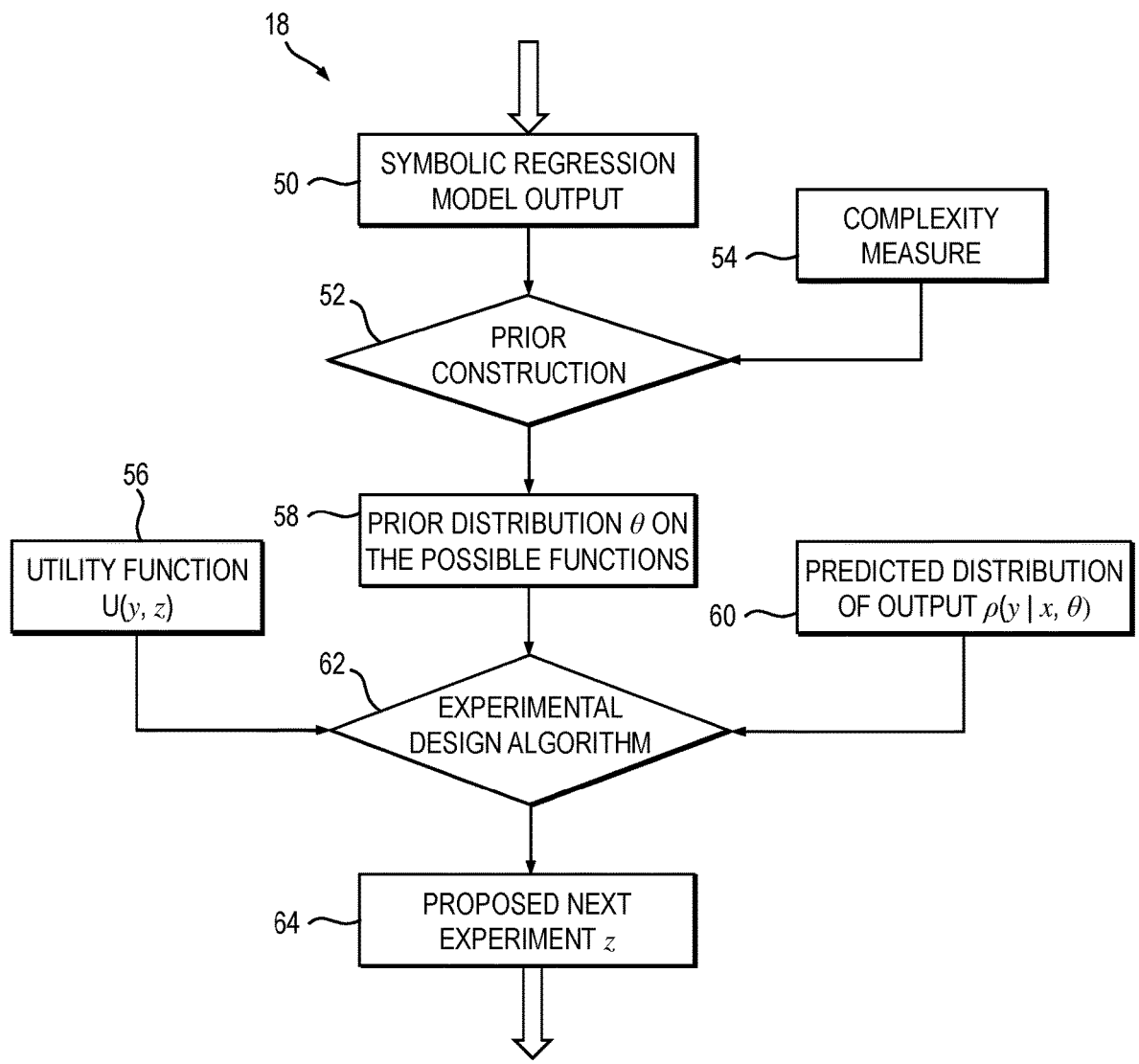
FIG. 3 is a flow diagram of a symbolic model discovery experimental design system illustrating an experimental design module.

With reference to FIGS. 2 and 3, a further description of the optimal Experimental Design Module (FIG. 3) and the Inference or Discovery Module (FIG. 2) according to one or more embodiments of the invention is set forth below.

Experimental Design Module

Assume one has a prediction mechanism and an inference engine. The next step is to determine how to design an experiment that attends jointly to model selection and parameter estimation. The experimental design module 18 seeks to determine the best experiment (64) that provides the most information regarding the functional form and parametrization for the underlying mathematical model, while adhering to other constraints/considerations such as prediction accuracy, model complexity and invariants.

Let z be a design parameter, or a set of design parameters, which can span the experimental design space, Z. Each experimental design, z, will correspond to a choice z∈Z, and x(z) will be a respective choice of the input parameter or parameters x based on that choice. Here z can either be a discrete or continuous set of parameters, or a combination of both.

Given a set of M models $\{f_\gamma\}_{\gamma 1}^M$ of different function forms (input 50 in FIG. 3), and respective parameters, $\theta_\gamma \subseteq \Theta_\gamma$ and prior distribution $p(f_\gamma)$, constructed in 52 using a complexity measure 54, one can assign a prior distribution 58 to each set of parameters $p(\theta_\gamma | f_\gamma)$. For a given choice of input parameter x∈χ, the predicted distribution 60 can then be denoted asp $(y|f_{\gamma,x})$. Further, model-parameter pairs shall be defined as, $\{(f_\gamma,\theta_\gamma)\}_{\theta_\gamma \in \Theta_\gamma, \gamma \in [M]}$ and their predictive distributions $\{p(y|f_\gamma,\theta_\gamma)\}_{\theta_\gamma \in \Theta_\gamma, \gamma \in [M]}$. A useful experiment is one that helps to differentiate between predictive distributions of various choices of function forms and parameterizations, while also being conscious of experimental budgetary constraints.

In one embodiment, experimental design of both model form and its parameterization can be accomplished by maximizing the Jensen-Shannon Divergence (an instance of the utility function 56), given by:

$$D_{JS} = \Sigma_{\gamma=1}^{n} p(f_\gamma) \int_{\Theta_\gamma} D_{KL}(p((y|f_{\gamma}, \theta_\gamma, x(z)) \| p(y|x(z))) p(\theta_\gamma|f_\gamma) d\theta_\gamma,$$

where $D_{KL}$ is the Kullback-Leibler divergence measure of two distributions. Here the terms are obtained, and the maximization is done, in 62, using the data of 58 and 60. In another embodiment, (using a different utility function 56), one can look for the input parameter $x \in \chi$, that maximize the information gain, given by the mutual information between $(f, \theta)$ and the output y:

$$z^* \in \arg\max_{z \in Z} \{I(f,\theta; y|x(z)) = H(f,\theta) = H(f,\infty) - H(f,\theta|y,x(z))\}$$

Here also the terms are obtained, and the maximization is done, in 62, using the data of 58 and 60. In either case, the resulting maximizing z* is output as a proposed experiment, in 64.

Following the selection of a proposed new data point, x, or parametrization of which, z, or alternatively the selection of a sequence or a batch of data points, an experiment or sequence of experiments is conducted, and respective experimental output results, y, are recorded. Provided the new data, the posterior distribution is updated. The updated distribution can be used for uncertainty quantification analysis, enables informed assessment among a plurality of functional forms and parametrizations, or alternatively for subsequent design of experiments.

In accordance with one or more embodiments of the invention, the experimental design, experimentation and posterior update processes may be repeated sequentially or performed in a batch form to account for situations where a set of experiments can be performed in a batch.

Example of Application: Kepler's Law

By way of example only and without limitation, an illustrative application of the present disclosure is set forth as follows. Data is known about the speed, the mass, and distance of planets with their satellite (for example the earth-moon system). From these data pairs the formula discovery module produces a formula that defines the speed of a satellite around its planet. If the error is too big or if two solutions are provided and there is uncertainty as to which solution is correct, the experimental design module will design a new experiment to sample more data. This experiment will then be defined on the system under investigation (for example the earth-moon system) given the description of the available instrumentation to collect the data. This instrumentation could be hardware (a telescope on top of an artificial satellite) or software (new ways to split the data in ways that help the learning). The data collection module will then apply the experimentation directives on the system under investigation.

For example, the artificial satellite will move on the right position and turn the telescope to the right orientation and use it to measure the distance earth-moon in a specific time interval. Alternatively, the data collection module will split the data and will provide the new dataset opportunely divided as output, following the direction of the experimentation module. The system may then again apply the formula discovery module and produce a new formula. Once the formula (induced symbolic model) is determined, the system can use it as a prediction model. Given data of a planet never before observed, the system can then generate a predicted output of the speed of the planet's satellite.

Example of Application: Biology

Laboratory robotics is becoming more and more widespread, especially in chemistry and biology, where robots are used to both analyze and perform experiments on the systems under investigation. While most automation in labs is based on simple and repetitive tasks, there are a few promising new efforts in automatizing the whole scientific process, e.g. the Robot Scientist project. The Robot Scientist is a physical implementation of the task of scientific discovery in a microbiology laboratory. It represents the merging of increasingly automated and remotely controllable laboratory equipment and knowledge discovery techniques from artificial intelligence. An example of the application of the present disclosure is experiment design for learning cell signaling systems. The data consists of protein expressions, which the discovery module ingests and produces a set of possible systems of differential equations with different functional forms and parameter assignments. The experimental design module decides which experiments, e.g. which protein activators or inhibitors, are the most informative in order to distinguish the correct model. The experimentation module decides the sequence of action that a specific machine will perform (in the data collection phase). Then the hardware machine will perform this sequence of actions on the system under investigation (e.g. a set of T cells) collecting the data (number of samples) using the available instrumentation available in the machine (e.g. mass cytometry). The process can be iterated until the functional form and parameter assignments can be determined with enough confidence. Finally, once the model is determined it can be used to predict the output given new inputs.

Embodiments of the invention may be implemented together with virtually any type of computer, regardless of the platform being suitable for storing and/or executing program code. By way of example only and without limitation, FIG. 4 is a block diagram depicting at least a portion of an illustrative computing system 400 suitable for executing program code related to the proposed method(s).

The computing system 400 is only one example of a suitable computer system and is not intended to suggest any limitation as to the scope of use or functionality of embodiments of the invention described herein, regardless, whether the computer system 400 is capable of being implemented and/or performing any of the functionality set forth hereinabove. In the computer system 400, there are components, which are adapted for connection to and operational with numerous other general-purpose or special-purpose computing system environments or configurations. Examples of well-known computing systems, environments, and/or configurations that may be suitable for use with computer system 400 include, but are not limited to, personal computer systems, server computer systems (i.e., servers), thin clients, thick clients, hand-held or laptop devices, multiprocessor systems, microprocessor-based systems, programmable consumer electronics, network PCs, minicomputer systems, mainframe computer systems, and distributed cloud computing environments that include any of the above systems or devices, and the like. The computer system 400 may be described in the general context of computer system-executable instructions, such as program modules, being executed by the computer system 400. Generally, program modules may include routines, programs, objects, components, logic, data structures, and so on that perform particular tasks or implement particular abstract data types. The computer system 400 may be practiced in distributed cloud computing environments where tasks are performed by remote processing devices that are linked through a communications network. In a distributed cloud computing environment, program modules may be located in both local and remote computer system storage media, including memory storage devices.

Figure 4:
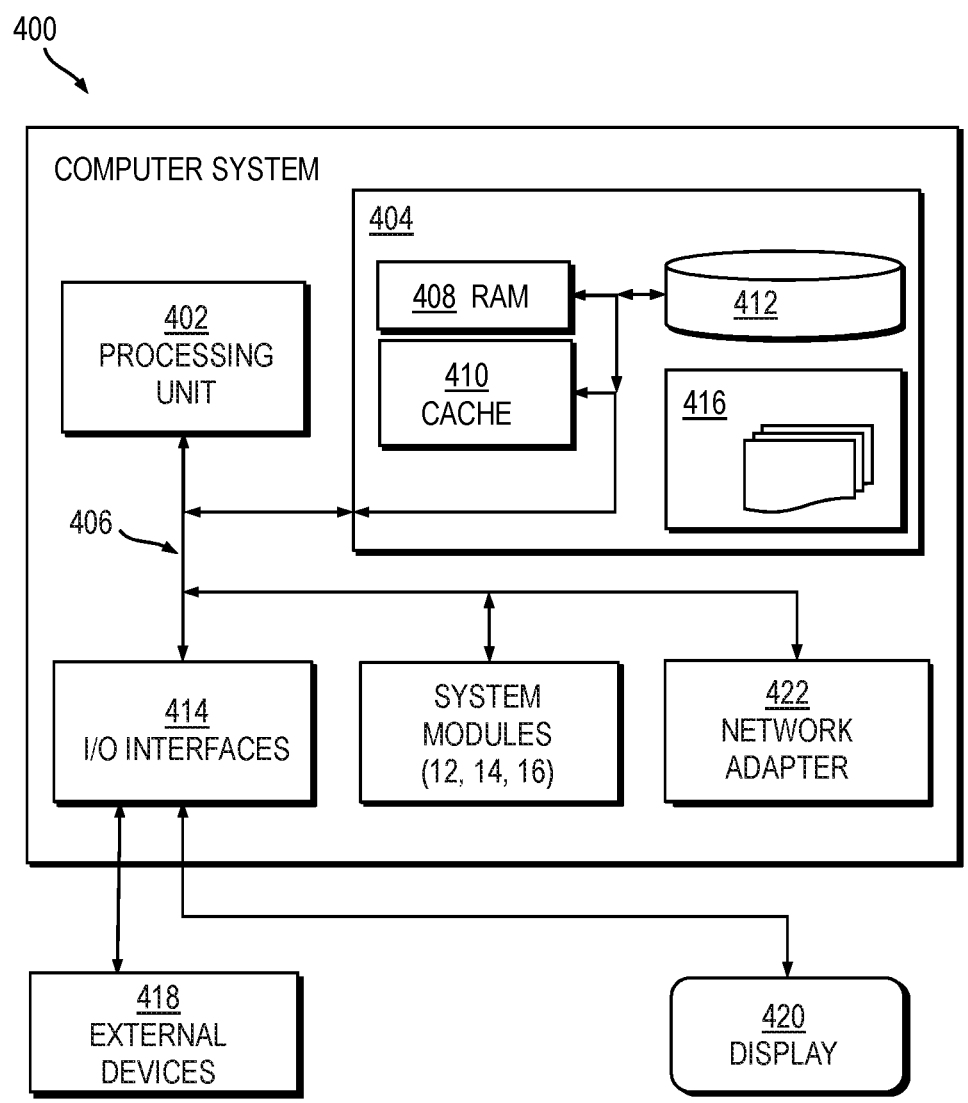
FIG. 4 is a block diagram depicting at least a portion of an illustrative computing system suitable for executing program code related to the proposed methods, according to an embodiment of the present invention.

As shown in FIG. 4, the computer system 400 is shown in the form of a general-purpose computing device. Components of computer system 400 may include, but are not limited to, one or more processors or processing units 402, a system memory 404, and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system 400 typically includes a variety of computer system readable media. Such media may be any available media that is accessible by computer system 400, and it includes both, volatile and non-volatile media, removable and non-removable media.

The system memory 404 may include computer system readable media in the form of volatile memory, such as random-access memory (RAM) 408 and/or cache memory 410. Computer system 400 may further include other removable/non-removable, volatile/non-volatile computer system storage media. By way of example only, a storage system 412 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, memory 404 may include at least one program product having a set (e.g., at least one) of program modules that are configured to carry out the functions of embodiments of the invention.

The program/utility, having a set (at least one) of program modules 416, may be stored in memory 404 by way of example, and not limiting, as well as an operating system, one or more application programs, other program modules, and program data. Each of the operating systems, one or more application programs, other program modules, and program data or some combination thereof, may include an implementation of a networking environment. The program modules 416 generally carry out the functions and/or methodologies of embodiments of the invention, as described herein.

The computer system 400 may also communicate with one or more external devices 418 such as a keyboard, a pointing device, a display 420, etc.; one or more devices that enable a user to interact with the computer system 400; and/or any devices (e.g., network card, modem, etc.) that enable the computer system 400 to communicate with one or more other computing devices. Such communication can occur via input/output (I/O) interfaces 414. Still yet, the computer system 400 may communicate with one or more networks such as a local area network (LAN), a general wide area network (WAN), and/or a public network (e.g., the Internet) via a network adapter 422. As depicted, the network adapter 422 may communicate with the other components of the computer system 400 via the bus 406. Although not explicitly shown, other hardware and/or software components could be used in conjunction with the computer system 400. Examples, include, but are not limited to: microcode, device drivers, redundant processing units, external disk drive arrays, redundant array of independent disks (RAID) systems, tape drives, and data archival storage systems, etc.

Additionally, further components of the system for selecting at least one new data point through optimal experimental design are attached to the bus 406. This may include, for example, the experimental design module (12 in FIG. 1), the formula discovery module (14 in FIG. 1) and the prediction module (16 in FIG. 1).

The descriptions of the various embodiments of the present invention have been presented for purposes of illustration, but are not intended to be exhaustive or limited to the embodiments disclosed. Modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be embodied as a system, a method, and/or a computer program product. The computer program product may include a computer readable storage medium (or media) having computer readable program instructions thereon for causing a processor to carry out one or more aspects of the present invention.

The medium may be an electronic, magnetic, optical, electromagnetic, infrared or a semi-conductor system for a propagation medium. Examples of a computer-readable medium may include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be any non-transitory (i.e., tangible) device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to one or more processors of a general purpose computer, special purpose computer, or other programmable data processing apparatus to produce a specific machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another devices to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, circuit, or portion of instructions, which comprises one or more executable instructions for implementing the specified logical function(s). In some alternative implementations, the functions noted in the block may occur out of the order noted in the figures. For example, the functionality embodied by two blocks shown in succession may, in fact, be performed substantially concurrently, or the blocks may sometimes be executed in the reverse order, depending upon the functionality involved.

It will also be noted that each block in the block diagrams and/or flowchart illustrations, and combinations of blocks in the block diagrams and/or flowchart illustrations, can be implemented by special purpose hardware-based systems that perform the specified functions or act or carry out combinations of special purpose hardware and computer instructions. Accordingly, the specification and drawings are to be regarded in an illustrative rather than a restrictive sense.

Reference made throughout this specification to "one embodiment" or "an embodiment" is intended to mean that a particular feature, structure, or characteristic described in connection with the embodiment is included in at least one embodiment of the claimed subject matter. It is to be understood that appearances of the phrase "in one embodiment" or "an embodiment" are not necessarily all referring to the same embodiment. Furthermore, embodiments may be referred to herein, individually and/or collectively, by the term "embodiment" merely for convenience and without intending to limit the scope of this application to any single embodiment or inventive concept if more than one is in fact shown. Thus, although specific embodiments have been illustrated and described herein, it is to be appreciated that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The terminology used herein is for describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Terms such as "above" and "below," where used, are intended to indicate the position of elements or structures relative to one another, rather than to absolute positioning.

The corresponding structures, materials, acts, and equivalents of any means or step-plus-function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit thereof. The embodiments were chosen and described in order to best explain principles and practical applications, and to enable others of ordinary skill in the art to understand the various embodiments with various modifications as are suited to the particular use contemplated.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, the claimed subject matter may lie in less than all features of a single embodiment. Thus, the following claims are hereby incorporated into the Detailed Description, with each claim standing on its own as separately claimed subject matter.

Given the teachings provided herein, one of ordinary skill in the art will be able to contemplate other implementations and applications of the techniques and disclosed embodiments. Although illustrative embodiments have been described herein with reference to the accompanying drawings, it is to be understood that illustrative embodiments are not limited to those precise embodiments, and that various other changes and modifications are made therein by one skilled in the art without departing from the scope of the appended claims.

What is claimed is:

1. A computer-implemented method using a symbolic regression model to generate accurate output predictions, the method comprising:
    obtaining a set of input values, wherein said set of input values are a starting point for a symbolic regression model discovery process relating to a system under investigation;
    determining a prediction for a set of output values for a given inquiry data point, functional form and parameterization for conducting one or more experiments relating to said system under investigation that validates obtaining a set of output values from said set of input values, wherein said one or more experiments are selected to provide maximum information gained among a plurality of experiments available;
    determining a sequence of actions for performing said at least one experiment and selecting one or more instrumentation to perform said at least one experiment, wherein said instrumentation generates, one or more input parameter inquiry values for a next sequence of experiments;
    collecting data from said one or more experiments and using the collected data in performing discovery of a plurality of underlying symbolic regression models
    selecting an optimal symbolic regression model from the plurality of underlying symbolic regression models, wherein the selected optimal symbolic regression model minimizes complexity for a bounded misfit, or minimizes a misfit measure, subject to bounded complexity;
    determining a new data point by using said selected optimal symbolic regression model and updating a posterior distribution, given results and data collected from said one or more experiments relating to the system under investigation to provide informed assessment among a plurality of functional forms and parameterizations to generate said predicted accurate output values.

2. The method of claim 1, wherein additional experiments are selected and performed iteratively following said at least one or more experiments until accurate experimental output values are obtained; and
    the determined prediction value maximizes a divergence of candidate probability distributions relating to the at least one or more experiments.

3. The method of claim 2, further comprising selecting the experiment such that both a parameterization and a functional form of discovered underlying selected symbolic models are provided.

4. The method of claim 1, further comprising:
    receiving pairs of input and output data, a definition of valid parsable grammar of mathematical expressions, a prediction error tolerance, and invariance constraints;
    selecting among a plurality of possible mathematical expressions that fit the pairs of input and output data within the prediction error tolerance; and
    generating, as an output, a discovered symbolic model.

5. The method of claim 4, further comprising:
    performing optimal symbolic regression articulated as a declarative mathematical programming problem; and
    discovering a simplest model that conforms with the pairs of input and output data, consistent with the grammar of mathematical expressions and the invariance constraints.

6. The method of claim 1, further comprising:
    receiving a functional form and tunable parameters, given an output of a previous iteration of performing discovery of symbolic models;
    determining a next most informative experiment as a function of the received functional form and tunable parameters; and
    generating one or more input parameter inquiry values for a next sequence of experiments.

7. The method of claim 1, wherein performing discovery of a plurality of underlying symbolic models, determining the new data point, and updating the posterior distribution are at least one of repeated sequentially and performed in a batch.

8. An apparatus for selecting at least one new data point through optimal experimental design, the apparatus comprising:
    memory; and
    at least one processor operably coupled with the memory, the at least one processor configured:
        to obtain a set of input values in a model discovery process relating to a system under investigation;

to generate prediction values for a for a set of output values for a given inquiry data point, functional forms along with their respective parameterizations for conducting one or more experiments relating to said system under investigation, wherein said one or more experiments are selected to provide maximum information gained among a plurality of experiments to provide accurate prediction of said output values, the prediction values being used to:
- determine a sequence of action for performing said at least one experiment and selecting one or more instrumentation to perform said at least one experiment and collect data, wherein said instrumentation generates, one or more input parameter inquiry values for a next sequence of experiments; and
- determine a plurality of underlying regression models and select at least one of said underlying regression models using data collected from said one or more experiments;
- select an optimal symbolic regression model from the plurality of underlying regression models, wherein the selected optimal symbolic regression model minimizes complexity for a bounded misfit, or minimizes a misfit measure, subject to bounded complexity based on said output values; and
- determine a new data point by using said selected optimal symbolic regression model and updating a posterior distribution, given results and data collected from aid one or more experiments relating to the system under investigation to provide informed assessment among a plurality of functional forms and parameterizations to generate said predicted accurate output values.

9. The apparatus according to claim 8, wherein the prediction values correspond to an experiment that maximizes information gained and maximizes a divergence of candidate probability distributions relating to the experiment.

10. The apparatus according to claim 9, wherein the experiment is selected such that both a parameterization and a functional form of discovered underlying selected model are provided and said underlying regression model selected provides an optimal solution amongst a sequence of experiments amongst a set that provides the most information enabling experimental data-substantiated distinction between functional forms and respective parameterizations for underlying mathematical models describing the system under investigation.

11. The apparatus according to claim 8, wherein the at least one processor comprises a prediction module, the prediction module being adapted to receive inquiry input data and being configured to generate at least one prediction value for a given input dataset as a function of at least one of the inquiry input data and a functional form and parameterization associated with the inquiry input data.

12. The apparatus according to claim 8, wherein the at least one processor comprises a discovery module, the discovery module being adapted to receive pairs of input and output data, a definition of valid parsable grammar of mathematical expressions, a prediction error tolerance, and invariance constraints, to select among a plurality of possible mathematical expressions that fit the pairs of input and output data within the prediction error tolerance, and to generate, as an output, a discovered symbolic model.

13. The apparatus according to claim 12, further comprising
a grammar element coupled with the discovery module, the grammar element being configured to define and encode, as constraints, a grammar of the discovered symbolic model.

14. The apparatus according to claim 12, wherein the discovery module is configured to perform optimal symbolic regression articulated as a declarative mathematical programming problem, and to discover a simplest model that conforms with the pairs of input and output data, consistent with the grammar of mathematical expressions and the invariance constraints.

15. The apparatus according to claim 12, wherein the discovery module is configured to perform optimal symbolic regression articulated as a non-declarative mathematical programming problem, and to discover a simplest model that conforms with the pairs of input and output data, consistent with the grammar of mathematical expressions and the invariance constraints.

16. The apparatus according to claim 8, wherein the at least one processor comprises an experimental design module, the experimental design module being adapted to receive a functional form and tunable parameters corresponding to one or more models, given an output of a previous iteration of the model discovery process, and being configured to determine a next most informative experiment as a function of the received functional form and tunable parameters considered and to generate one or more input parameter inquiry values for a next sequence of experiments.

17. The apparatus according to claim 16, wherein the experimental design module is configured to receive an instrumentation description and to generate, as a function of the instrumentation description and the one or more input parameter inquiry values for a next sequence of experiments, a sequence of actions to be executed by instrumentation hardware that uses the sequence of actions to perform the next sequence of experiments.

18. The apparatus according to claim 17, wherein the experimental design module comprises a data collection module corresponding to the instrumentation hardware that uses the sequence of actions to perform the next sequence of experiments, the data collection module being configured to collect output data of the system under investigation under different experimental regimes.

19. The apparatus according to claim 16, wherein the experimental design module receives discovery functionality and input regarding a feasible domain in which input data can be collected, the experimental design module determining a feasible experimental design, enabling distinction among a plurality of possible functional forms and parametrizations.

* * * * *